3,260,761
PRODUCTION OF TRICHLORETHYLENE
Harry O. Burrus, Lewiston, and Ronald F. Mason, Wilson, N.Y., assignors to E. I. du Pont de Nemours and Company, Wilmington, Del., a corporation of Delaware
No Drawing. Filed June 4, 1962, Ser. No. 199,604
9 Claims. (Cl. 260—654)

This invention relates to a method of making trichlorethylene and perchlorethylene from hydrocarbons. It relates particularly to a process for the production of these products from carbon tetrachloride and hexachlorethane.

The major products obtained by the complete chlorination of hydrocarbons at high temperatures and/or pressures are carbon tetrachloride and hexachlorethane. These compounds are not only obtained from the chlorination of methane or ethane but are also produced by the chlorinolysis of higher hydrocarbons such as butane, benzene, toluene, etc. In addition, they are commonly isolated as by-products in most processes for the production of trichlorethylene and perchlorethylene. Methods for converting carbon tetrachloride to hexachlorethane are well known and pyrolytic reactions wherein hexachlorethane loses chlorine to give perchlorethylene are described in the prior art. However, a practical process for the conversion of carbon tetrachloride and hexachlorethane to perchlorethylene without undue loss of chlorine values and a method for converting perchlorethylene to trichlorethylene having not been developed. The latter step is essential for a flexible process directed to the manufacture of both trichlorethylene and perchlorethylene in the varying ratios dictated by marketing requirements.

The object of this invention is to provide a process by which carbon tetrachloride and/or hexachlorethane produced by the complete chlorination or chlorinolysis of hydrocarbons can be converted to trichlorethylene and perchlorethylene in any desired proportion. A further objective is to provide a process by which carbon tetrachloride and/or hexachlorethane can be converted to trichlorethylene and perchlorethylene by use of a hydrocarbon chlorine acceptor which is itself converted to a chlorinated hydrocarbon which can be further chlorinated to yield carbon tetrachloride and/or hexachlorethane. A still further objective is to provide a process for the conversion of perchlorethylene to trichlorethylene.

These objectives can be carried out by a novel combination of chemical reactions using as raw materials carbon tetrachloride and/or hexachlorethane in combination with a chlorine acceptor consisting of a hydrocarbon or partially chlorinated hydrocarbon. These reactions are set forth in the following equations in which the expression, RH, stands for the chlorine acceptor which contains at least one hydrogen atom that can be replaced by chlorine.

$$2\ CCl_4 + 2\ C_2Cl_6 + 4\ RH = 3\ C_2Cl_4 + 4\ RCl + 4\ HCl \quad (1)$$
$$C_2Cl_4 + HCl = C_2HCl_5 \quad (2)$$
$$C_2HCl_5 + RH = C_2HCl_3 + RCl + HCl \quad (3)$$

It should be understood that either carbon tetrachloride or hexachlorethane can be employed as a raw material and that they may be used alone or as mixtures. Equation 1 is the equivalent of two separate equations as shown below.

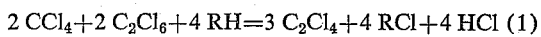
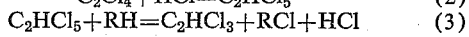

$$2\ CCl_4 + 2\ RH = C_2Cl_4 + 2\ RCl + 2\ HCl \quad (1a)$$
$$2\ C_2Cl_6 + H_2 = 2\ C_2Cl_4 + 2\ RCl + 2\ HCl \quad (1b)$$

It should also be understood that the chlorine acceptor, RH, may have two or more of its replaceable hydrogen atoms exchanged for chlorine in reactions (1) or (3). This is illustrated by the following equations in which benzene and chlorobenzenes are involved.

$$2\ CCl_4 + 2\ C_2Cl_6 + C_6H_6$$
$$= 3\ C_2Cl_4 + C_6H_2Cl_4 + 4\ HCl \quad (1x)$$
$$2\ C_2HCl_5 + C_6H_2Cl_4 = 2\ C_2HCl_3 + C_6Cl_6 + 2\ HCl \quad (3x)$$

For the purposes of this patent, the chlorine acceptor, RH, will be so designated whether employed as a single compound or as a mixture of several compounds. It will also be seen that the by-product obtained by the chlorination of the acceptor in reactions (1) or (3), viz. the material designated by RCl in these equations, may be one or more of a large number of partially or wholly chlorinated hydrocarbons, singly or in the form of a mixture. The chlorine values present in the organic by-product are not lost since by subjection to complete chlorinolysis, they may be converted to carbon tetrachloride and/or hexachlorethane and thus recovered for use as a process raw material. The process of this invention may, in fact, be regarded as a method by which the chlorine acceptor may be converted to trichlorethylene and perchlorethylene.

The preferred chlorine acceptors for use in the process of this invention are the simple mononuclear aromatic hydrocarbons, such as benzene, toluene and xylene. Aromatic hydrocarbons are preferred because their chlorinated derivatives have been found to show no tendency to decompose under the conditions of this invention, whereas partially chlorinated aliphatic hydrocarbons are less efficient due to the ease with which they are dehydrochlorinated. Dehydrochlorination results in the loss of replaceable hydrogen atoms in the acceptor molecule. However, aliphatic hydrocarbons and their partially chlorinated derivatives can be used as acceptors if desired. Tetrachlorethane itself acts as a chlorine acceptor in the conversion of carbon tetrachloride to perchlorethylene in the vapor phase at about 450° C. It has also been discovered that 1-chlorobutane can be used in the conversion of hexachlorethane to perchlorethylene in the liquid phase at 300° C. In addition, it has been demonstrated that methane can be employed in the vapor phase conversion of pentachlorethane to trichlorethylene (Reaction 3). A twenty-two second exposure of a 1:1 molar mixture of pentachlorethane and methane at 457° C. resulted in a 17% conversion of pentachlorethane to trichlorethylene in the vapor phase at approximately 450° C.

The conversion of carbon tetrachloride and/or hexachlorethane to perchlorethylene has been found to take place in the liquid or vapor phase at temperatures of 300° C. or above in the absence of added catalysts. Preferred conditions involve a vapor phase reaction at temperatures in the range from about 400° C. to about 500° C. In this connection, it has been further discovered that the vapor phase reaction technique of Copelin et al., U.S. Patent 2,957,923 (October 25, 1960), involving a heated open-tube reaction zone followed by an unheated zone may be employed with excellent results.

Suitable temperatures for the conversion of carbon tetrachloride to hexachlorethane and perchlorethylene in the absence of a chlorine acceptor lie in the range 600° C. to 1500° C. as disclosed by Strosacker et al., U.S. Patent 1,930,350 (October 10, 1933). In these reactions chlorine gas in liberated as shown below:

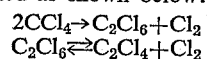
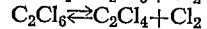

$$2\ CCl_4 \rightarrow C_2Cl_6 + Cl_2$$
$$C_2Cl_6 \rightleftharpoons C_2Cl_4 + Cl_2$$

The conversion of perchlorethylene to trichlorethylene by the process of this invention is carried out by a combination of the two novel reactions involving the hydrochlorination of perchlorethylene to pentachlorethane (reaction (2)) and the dechlorination of pentachlorethane to trichlorethylene (reaction (3)). Of these, the hydrochlorination of perchlorethylene (reaction (2)) is the subject of co-pending application by Harry B. Copelin, Serial No. 199,598, filed June 4, 1962.

Unlike most compounds with an unsaturated bond between carbon atoms, perchlorethylene is substantially inert chemically and its reaction with hydrogen chloride to produce pentachlorethane has not been encountered in the chemical literature. It has been discovered (Serial No. 199,598, filed June 4, 1962) that this reaction will take place in the presence of aluminum chloride and other metal and metalloid halides of the type known as Friedel-Crafts catalysts. Reaction conditions include pressures of at least about 500 p.s.i.g. (pounds per square inch gauge) and temperatures of 100° C. or higher. The preferred catalyst is aluminum chloride which should be present to the extent of about 10 to 30 mole percent based on the perchlorethylene charged for best results. Fair results may also be obtained by the use of ferric chloride as a catalyst. Other catalysts include stannic chloride, boron trifluoride, titanium tetrachloride and antimony pentachloride. Preferred reaction temperatures lie in the range of about 100° C. to about 200° C., although the best yields, which are substantially quantitative, take place at about 125° C. to about 135° C. At the higher temperatures, yields decrease and increasing amounts of high-boiling by-products are produced. No appreciable amount of pentachlorethane is obtained in the absence of catalyst and practical yields cannot be obtained in reasonable reaction periods at pressures below 500 p.s.i.g.

Pentachlorethane normally dehydrochlorinates to give perchlorethylene on heating. It has now been discovered that this compound can be dechlorinated to give trichlorethylene. This dechlorination takes place when pentachlorethane is heated in the range 200° C. to about 450° C. in the presence of a chlorine acceptor consisting of a hydrocarbon or a partially chlorinated hydrocarbon. Preferred chlorine acceptors are the aromatic hydrocarbons or their partially chlorinated derivatives. This reaction will proceed in the absence of an added catalyst but improved results are secured in the presence of small amounts of Friedel-Crafts catalysts such as ferric chloride. The use of high temperatures and the more powerful catalysts should be avoided since these tend to cause the resultant trichlorethylene to polymerize and form high-boiling tars or other relatively non-volatile by-products. Some perchlorethylene is always produced in this reaction by the normal dehydrochlorination of the pentachlorethane.

Attempts to combine the hydrochlorination and dechlorination of perchlorethylene into a one-step process give only a small yield of trichlorethylene. A 2.5 percent conversion of pentachlorethane to trichlorethylene was obtained by heating perchlorethylene containing 33 mole percent of benzene with excess hydrogen chloride in the presence of 1 percent ferric chloride by weight for three hours at 300° C. A similar experiment in the absence of hydrogen chloride gave a 1.4 percent yield of trichlorethylene. The use of more strenuous conditions of temperature and catalysis for this reaction would, as previously noted, produce trichlorethylene but such conditions would result in its rapid conversion to high-boiling products.

The following examples are introduced to illustrate the invention in greater detail but must not be construed as limiting it.

*Example 1*

A 12:1 molar mixture of carbon tetrachloride and benzene was passed through a reactor consisting of a heated zone and an unheated zone in the vapor state. The exposure of the heated gases in the reactor was about 30 seconds and the average temperature of the heated zone in the reactor was 431° C. As a result of this reaction 37% of the carbon tetrachloride was converted to perchlorethylene with a net yield of 97.9%. Approximately 1.8% of the carbon tetrachloride was recovered in the form of hexachlorethane. The organic by-products resulting from the reaction of the chlorine acceptor, benzene, with the carbon tetrachloride were made up principally of tri-, tetra-, penta-, and hexachlorobenzene. The major yield consisting of the tetra- and penta-chlor derivatives.

*Example 2*

A series of experiments was carried out in which one mole proportion of perchlorethylene was heated with hydrogen chloride under varying conditions of temperature, pressure and catalysis. The results obtained in these experiments together with the conditions prevailing in each are summarized in the following table.

| Exp. No. | Catalyst | | Temp., ° C. | Max. Pressure, p.s.i.g. | Conversion of $C_2Cl_4$ to $C_2HCl_5$ (percent) |
| --- | --- | --- | --- | --- | --- |
| | Name | Mole percent | | | |
| 1 | $AlCl_3$ | 18 | 130 | 1,000 | 92 |
| 2 | $AlCl_3$ | 20 | 160 | 1,600 | 83 |
| 3 | $AlCl_3$ | 19 | 25 | 475 | 0.5 |
| 4 | $FeCl_3$ | 18 | 150 | 1,400 | 17 |
| 5 | $FeCl_3$ | 17 | 150 | 1,500 | 18 |
| 6 | No Catalyst | | 150 | 1,600 | 0 |

The reaction period for the tests summarized above was 2 hours except for Experiment No. 3 which was cut short after one hour since little or no reaction was indicated by the pressure gauge which served as an index for hydrogen chloride consumption.

*Example 3*

A series of tests was carried out in which one molecular proportion of pentachlorethane was heated with 0.5 molecular proportions of benzene which served as a chlorine acceptor. These experiments were carried out in the presence and absence of ferric chloride for various time periods at a temperature of 300° C. A control experiment, No. 5, was carried out in the absence of a chlorine acceptor. Results are summarized in the following table.

| Exp. No. | Catalyst—$FeCl_3$, Percent by Wt. on $C_2HCl_5$ | Time, Hrs. | Conversion of $C_2HCl_5$ to $C_2HCl_3$ |
| --- | --- | --- | --- |
| 1 | 0 | 3.0 | 8.2 |
| 2 | 0 | 4.0 | 16.7 |
| 3* | 3.0 | 3.0 | 26.3 |
| 4 | 3.0 | 3.5 | 29.6 |
| 5 (Control) | 2.7 | 3.5 | 0 |

Experiment 3* was initially pressurized with 500 p.s.i.g. hydrogen chloride to see if this additive would depress the dehydrochlorination of pentachlorethane to perchlorethylene and improve the yield of trichlorethylene. This addition was substantially without effect. In control experiment 5, no trichlorethylene was obtained and the yield of perchlorethylene produced by dehydrochlorination was approximately 98%. Pentachlorethane not converted to trichlorethylene was converted to perchlorethylene in large part in all of these experiments.

*Example 4*

A series of tests was carried out in which two mole proportions of pentachlorethane was reacted with one mole proportion of benzene in the vapor phase at various temperatures and exposure times. The results of these tests are summarized in the table shown below:

| Exp. No. | Average Temp., °C. | Time (Sec.) | Percent Conversion of C₂HCl₅ to C₂HCl₃ |
|---|---|---|---|
| 1 | 450 | 20 | 20.0 |
| 2 | 400 | 30 | 11.1 |
| 3 | 416 | 45 | 9.8 |
| 4 | 397 | 96 | 9.6 |

Percent conversions in the above table are based on the pentachlorethane reacted.

The embodiments of the invention in which an exclusive property or privilege is claimed are defined as follows:

1. In a process for the production of perchlorethylene and trichlorethylene from a chlorinated material selected from the group consisting of carbon tetrachloride, hexachlorethane and mixtures thereof, the steps comprising:
   (a) converting the said chlorinated material to perchlorethylene by heating with a chlorine acceptor selected from the group consisting of aromatic hydrocarbons, partially chlorinated aromatic hydrocarbons and mixtures thereof at a temperature of at least about 300° C.,
   (b) hydrochlorinating a portion of said perchlorethylene to pentachlorethane by heating with hydrogen chloride at a pressure of at least 500 p.s.i.g. and a temperature of at least about 100° C. in the presence of a Friedel-Crafts catalyst selected from the group consisting of metal and metalloid halides,
   (c) dechlorinating said pentachlorethane of step (b) to trichlorethylene by heating with a chlorine acceptor of the group set forth in step (a) at a temperature in the range of about 200° C. to about 450° C.

2. The process of claim 1 in which the chlorine acceptor is benzene.

3. The process of claim 1 in which the chlorine acceptor is toluene.

4. The process of claim 1 in which step (b) is catalyzed with aluminum chloride.

5. The process of claim 1 in which step (c) is catalyzed with ferric chloride.

6. The process of claim 1 in which by-product chlorohydrocarbon obtained in steps (a) and (c) is chlorinated to produce chlorinated material selected from the group consisting of carbon tetrachloride, hexachlorethane and mixtures thereof for reuse in step (a).

7. The process for converting perchlorethylene to trichlorethylene comprising:
   (a) hydrochlorinating perchlorethylene to pentachlorethane by heating with hydrogen chloride gas at a pressure of at least 500 p.s.i.g. and a temperature of about 100° C. to about 200° C. in the presence of a Friedel-Crafts catalyst selected from the group consisting of metal and metalloid halides, and
   (b) dechlorinating said pentachlorethane of step (a) to trichlorethylene by heating with a chlorine acceptor selected from the group consisting of aromatic hydrocarbons, partially chlorinated aromatic hydrocarbons and mixtures thereof at a temperature in the range of about 200° C. to about 450° C.

8. The process of converting pentachlorethane to trichlorethylene by heating said pentachlorethane with a chlorine acceptor selected from the group consisting of aromatic hydrocarbons, chlorinated aromatic hydrocarbons and mixtures thereof at a temperature in the range of about 200° C. to about 450° C.

9. The process of claim 8 when carried out in the presence of ferric chloride.

References Cited by the Examiner
UNITED STATES PATENTS

| | | | |
|---|---|---|---|
| 1,930,350 | 10/1933 | Strosacker et al. | 360—658 |
| 2,504,919 | 4/1950 | Bordner | 260—654 |
| 2,957,923 | 10/1960 | Copelin et al. | 260—658 |

LEON ZITVER, *Primary Examiner.*

J. W. WILLIAMS, S. V. ROCKEY,
*Assistant Examiners.*